United States Patent
Hioki et al.

(10) Patent No.: US 7,542,017 B2
(45) Date of Patent: Jun. 2, 2009

(54) DISPLAY DEVICE

(75) Inventors: Tsuyoshi Hioki, Yokohama (JP); Haruhiko Okumura, Fujisawa (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 509 days.

(21) Appl. No.: 11/108,732

(22) Filed: Apr. 19, 2005

(65) Prior Publication Data

US 2005/0231680 A1 Oct. 20, 2005

(30) Foreign Application Priority Data

Apr. 19, 2004 (JP) ............................. 2004-123387

(51) Int. Cl.
*G09G 3/28* (2006.01)
(52) U.S. Cl. ..................... 345/76; 313/357; 313/491
(58) Field of Classification Search ........... 313/357, 313/491, 505, 584, 500, 503, 506, 509; 345/76; 359/345; 442/205, 301, 206, 207, 181, 185, 442/186
See application file for complete search history.

(56) References Cited

U.S. PATENT DOCUMENTS

| | | | | |
|---|---|---|---|---|
| 3,803,437 A | * | 4/1974 | Robinson | 313/483 |
| 5,962,967 A | * | 10/1999 | Kiryuschev et al. | 313/491 |
| 6,490,402 B1 | * | 12/2002 | Ota | 385/147 |
| 6,624,565 B2 | * | 9/2003 | Topelberg | 313/495 |
| 6,697,191 B2 | * | 2/2004 | Kiryuschev et al. | 359/345 |
| 6,859,594 B2 | * | 2/2005 | Cheng et al. | 385/120 |
| 6,969,185 B1 | * | 11/2005 | Adair | 362/542 |
| 7,144,830 B2 | * | 12/2006 | Hill et al. | 442/205 |

FOREIGN PATENT DOCUMENTS

| | | |
|---|---|---|
| JP | 64-034794 | 3/1989 |
| JP | 2002-184580 | 6/2002 |

* cited by examiner

*Primary Examiner*—Amr Awad
*Assistant Examiner*—Stephen G Sherman
(74) *Attorney, Agent, or Firm*—Oblon, Spivak, McClelland, Maier & Neustadt, P.C.

(57) ABSTRACT

A display device includes linear structures each having a first conductor linearly extended and a light emitting layer structure which covers at least a part of the conductor, the linear structures being arranged in parallel. The linear structures are electrically insulated by first insulating portions from one another. Second conductors are arranged in parallel so as to cross the linear structures and electrically connected to the light emitting layer structures at crossing portions arranged in a matrix. The linear conductors are electrically insulated by the linear conductors from one another.

16 Claims, 12 Drawing Sheets

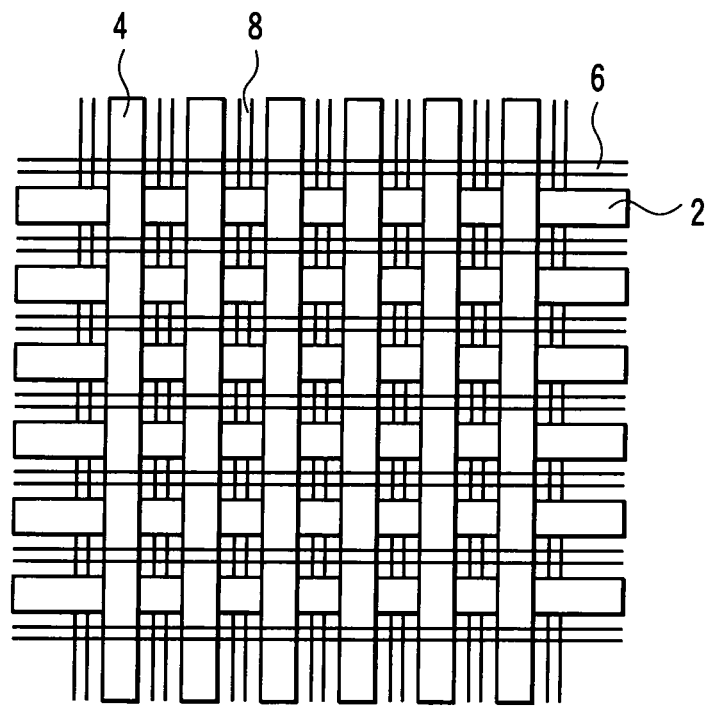
F I G. 14
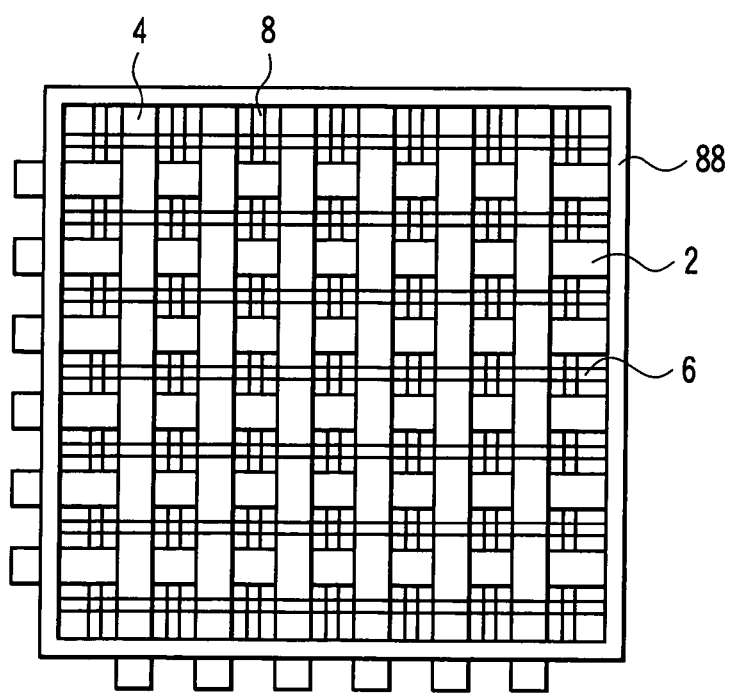
F I G. 15

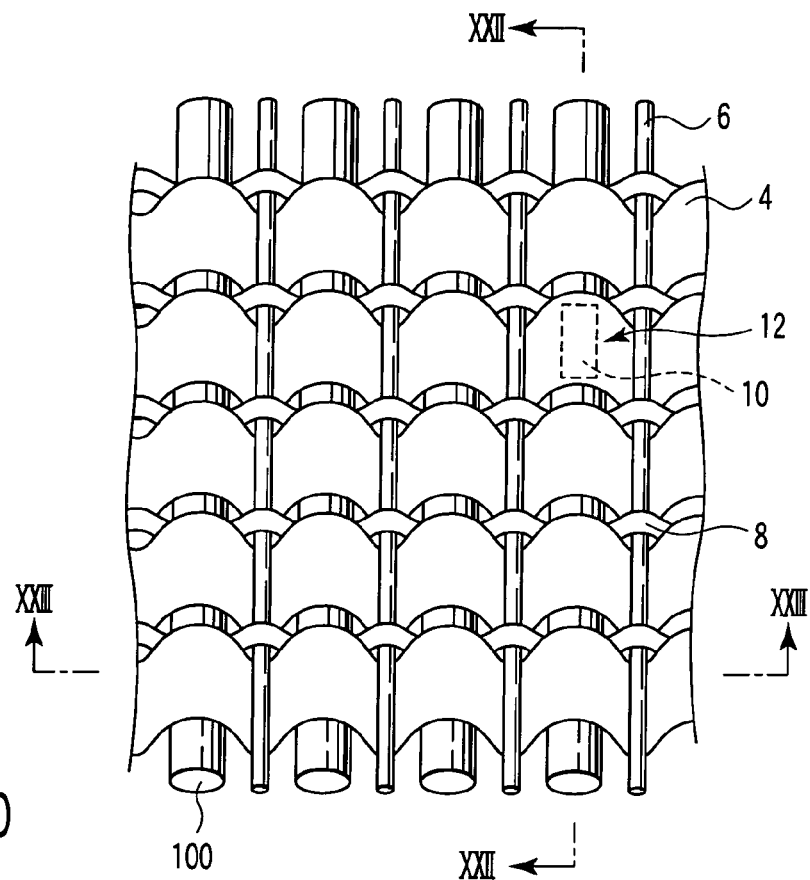
F I G. 2 0
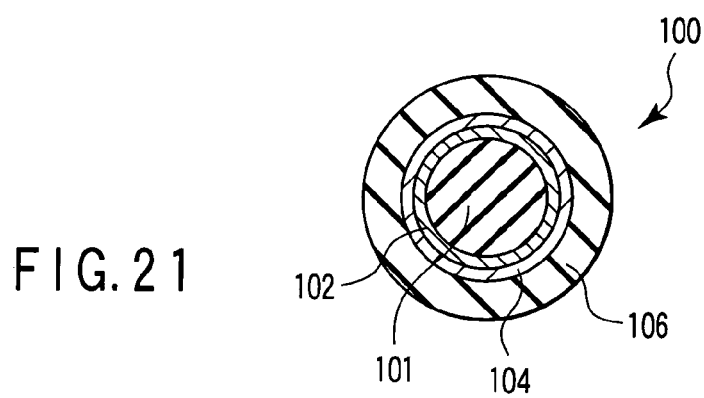
F I G. 2 1
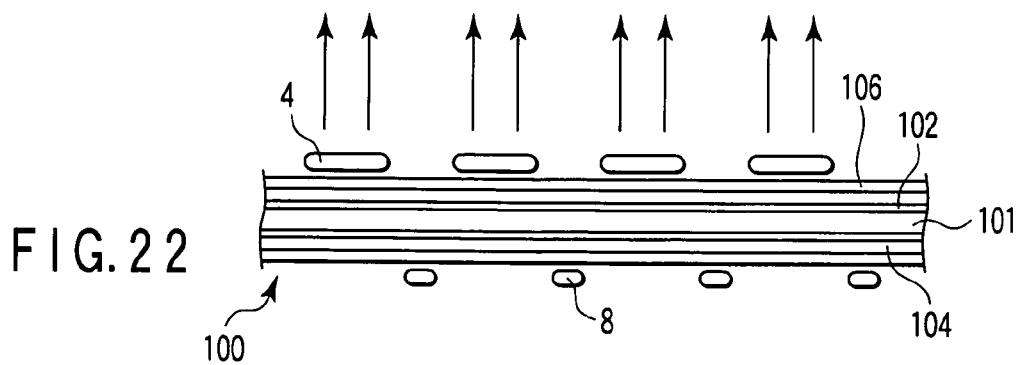
F I G. 2 2

DISPLAY DEVICE

CROSS-REFERENCE TO RELATED APPLICATIONS

This application is based upon and claims the benefit of priority from prior Japanese Patent Application No. 2004-123387, filed Apr. 19, 2004, the entire contents of which are incorporated herein by reference.

BACKGROUND OF THE INVENTION

1. Field of the Invention

The present invention relates to a display device, and in particular, to a display device comprising a mesh structure.

2. Description of the Related Art

Matrix driven display devices, which are presently widely used, are each formed as a matrix structure in which elements and wires are stacked on a support substrate such as a glass substrate. For example, in a passive matrix type liquid crystal display device, a silicon oxide film is formed on the glass substrate using a plasma enhanced chemical deposition method (PECVD), in order to prevent alkali elution. Subsequently, transparent electrodes consisting of a composite oxide of indium and tin (ITO) are formed on the silicon oxide film using a sputtering method or the like. Then, the transparent electrode layer is machined into a desired stripe shape using, for example, a photo-etching method. Further, for example, in a passive selfluminous display device having a selfluminous characteristic in which an organic material that exhibits electroluminescence (OLED) is used as a light emitting member, a film forming process and a photo-etching process are used to form a wiring structure constituting a matrix, on a glass substrate, as in the case of a passive liquid crystal display device. In this case, the glass substrate is present in order to support the wiring structure during the process or after a device has been formed. This is the only function of the glass substrate.

Thus, for display devices, a method of using a film forming process and a photo-etching process are mostly used to form wiring constituting a matrix, on a support substrate. Accordingly, the matrix structure presently used is formed by sequentially and repeatedly executing formation, machining, and the like of functional films starting at a position close to the substrate.

Jpn. Pat. Appln. KOKAI Publication No. 2002-184580 discloses the structure of a fibrous light source. However, in the fibrous light source, the emission of light by fibers is utilized and the fibers are arranged in coil form to construct an illuminating light source with a large area.

If the deposition of materials and the machining of films are sequentially executed starting at a position close to the substrate as described above, then the following problems may occur: the functions of the device are dominated by the support substrate, the wiring function is limited, the size of the display device is limited during design, and a large number of relevant members are consumed.

First, a function of the display device, particularly its shape, depends significantly on the support substrate. Typically, the glass substrate used in the display device has a thickness of, for example, 0.7 mm. If liquid crystal is used for display, a part of the display device which exhibits its function has a thickness of at most about 10 µm. However, the glass substrate accounts for most of the thickness of the display device. Further, in connection with a function of the display device, it may be desirable to make a display device flexible. However, with the glass substrate, it is difficult to make the display portion sufficiently flexible owing to the rigidity of glass. Thus, a plastic substrate, which is more flexible than the glass substrate, may be used in order to realize sufficient flexibility. However, even the plastic substrate may pose problems during the formation of a display device. For example, it is difficult to use a temperature process executed at at least 200° C. and the thickness must be, for example, at least 0.1 mm in order to ensure supportability during manufacture.

Further, when wiring is formed on the support substrate, a physical or chemical deposition method is mostly used to form desired metal and conductive composite oxides into thin film layers. On this occasion, for example, in order to ensure a sufficient charge transfer for the wiring, a technique for increasing the thickness during deposition is used. However, in view of productivity and for the purpose of preventing structural destruction caused by stress, the thickness is limited to at most 1 µm. This prevents a sufficient resistance cross section from being obtained. Consequently, display devices requiring a large current, a large area, or the like are limited by the performance of the wiring.

If the deposition of thin films and the photo-etching process are executed on the support substrate, the whole display device or a combination of display devices must be formed into a matrix structure. Thus, the size, fineness, and the like of the display device are determined in its design stage. This limits the degree of freedom during manufacture. That is, an intermediate device formed on the support substrate and including wiring is adaptable only to an initially designed display device. It is impossible to subsequently make an arbitrary change in display area or the like.

Moreover, if the deposition of thin films and the photo-etching process are executed on the support substrate, then disadvantageously a large number of consumable members are used, which are not left in the completed display device. For example, when wiring is formed, a thin film is deposited almost all over the surface of the support substrate, that is, in both parts of the substrate which require the wiring and those which do not require the wiring. In this case, the parts not requiring the wiring are removed by the etching process as unwanted members. Further, for the purpose of achieving this etching process, machining is carried out using a photo process with a photosensitive resin or the like. In this case, the photosensitive resin or the like is also removed as an unwanted member after the machining. A large number of these consumable members contribute to increasing the cost of the display device. Further, many of these consumable members may affect the global environments. Therefore, the amounts of such consumable members used must be reduced.

BRIEF SUMMARY OF THE INVENTION

It is an object of the present invention to provide a display device which does not require any support substrate during manufacture and which has an arbitrary shape, the display device being drivable with an arbitrary screen division.

According to the present invention, there is provided a display device comprising:

linear structures each comprising a first conductor linearly extended and a light emitting layer structure which covers at least a part of the conductor, the linear structures being arranged in parallel, first insulating portions which electrically insulate the linear structures from one another, linear second conductors arranged in parallel so as to cross the linear structures and electrically connected to the light emitting layer structures at crossing portions arranged in a matrix, and second insulating portions which electrically insulates the linear conductors from one another.

Further, according to the present invention, there is provided a method for manufacturing a display device, the method comprising:

providing a plurality of linear structures each comprising a first conductor linearly extended and a light emitting layer structure which covers at least a part of the conductor, the linear structures being arranged in parallel, providing first insulating lines each arranged between the linear structures to electrically insulate the linear structures from one another, providing linear second conductors and second linear insulators which insulates the second conductors, and forming a light emission matrix structure by braiding the linear second conductors and second linear insulators into the linear structures and first insulating lines while crossing the linear second conductors and second linear insulators to cross the linear structures and first insulating lines, to electrically contact the second conductors with the light emitting layer structures at crossing positions between the second conductors and the linear structures.

According to an embodiment of the present invention, functional layers and the like in linear form are machined into a matrix structure, that is, a mesh structure based on a weaving method, rather than stacking films on a support substrate as in the prior art.

BRIEF DESCRIPTION OF THE SEVERAL VIEWS OF THE DRAWING

FIG. 14 is a plan view schematically showing an example of the structure braided using the apparatus shown in FIG. 13;

FIG. 15 is a plan view illustrating a process of fixing a display portion shown in FIG. 14;

FIG. 20 is a perspective view schematically showing a display device according to a third embodiment of the present invention;

FIG. 21 is a sectional view schematically showing the structure of an electro-optical function line shown in FIG. 1;

FIG. 22 is a schematic sectional view of the display device schematically showing a sectional structure taken along line XXII-XXII in FIG. 20;

DETAILED DESCRIPTION OF THE INVENTION

With reference to the drawings, description will be given of display devices according to embodiments of the present invention.

FIRST EMBODIMENT

Figure 1:
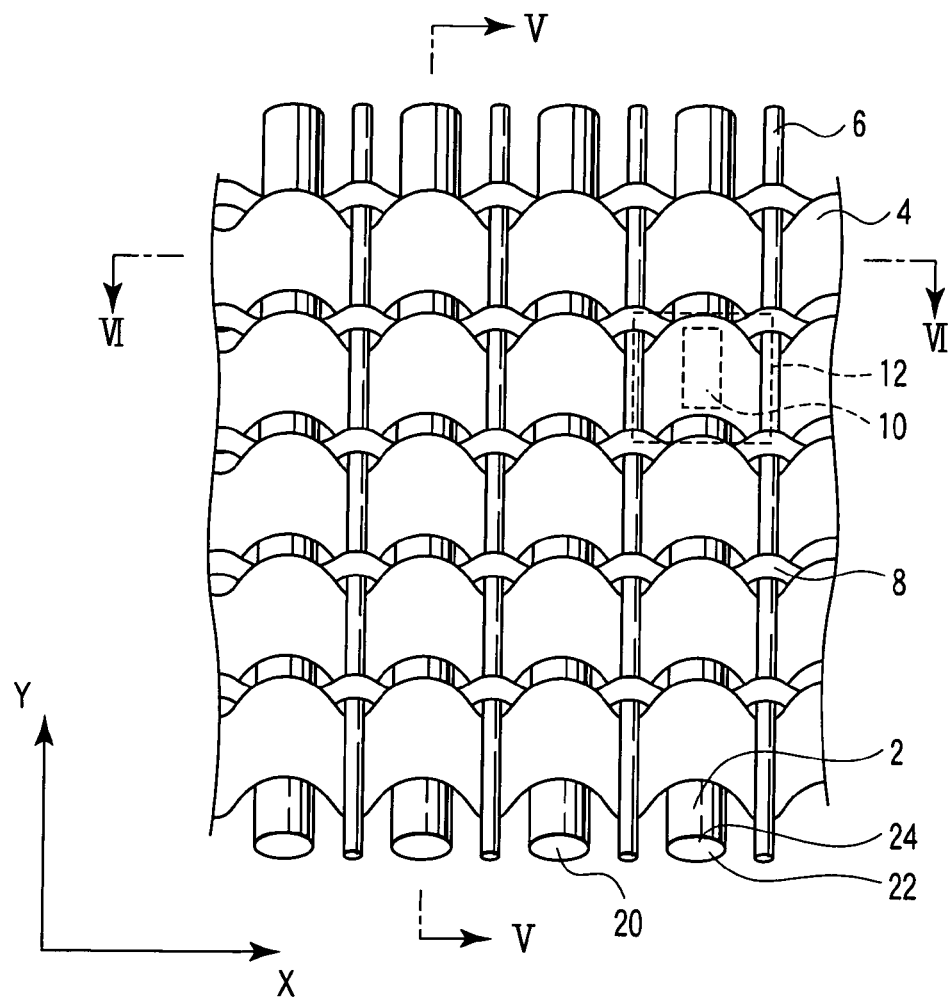
FIG. 1 is a perspective view schematically showing a display device according to an embodiment of the present invention.

FIG. 1 is a perspective view schematically showing a display device according to an embodiment of the present invention. The display device shown in FIG. 1 uses self-emitting mode (self-luminous mode) and a passive matrix as a driving method. The display device is composed of light-emitting functional lines 2, transparent conductive lines 4, inter-X-layer insulating lines 6, and inter-Y-layer insulating lines 8. In FIG. 1, a direction in which the light-emitting functional lines 2 are extended is defined as the X direction. A direction in which the transparent conductive lines 4 are extended is defined as the Y direction. In an X direction cross section, the light-emitting functional lines 2 and the inter-Y-layer insulating lines 6 are alternately arranged along the X direction (these are called a group of Y lines). In a Y direction cross section, the transparent conductive lines 4 and the inter-X-layer insulating lines 8 are alternately arranged along the Y direction (these are called a group of X lines). The group of X lines is arranged parallel to one another and the group of Y lines is arranged parallel to one another.

The group of X lines and the group of Y lines are alternately braided in a mesh. That is, the light-emitting functional lines 2 and the inter-Y-layer insulating lines 6 are extended on a substantially straight line in the Y direction. The transparent conductive lines 4 are extended over the light-emitting functional lines 2 and under the inter-Y-layer insulating lines 6 in wavy form. Further, the inter-X-layer insulating lines 8 are extended under the light-emitting functional lines 2 and over the inter-Y-layer insulating lines 6 in wavy form. That is, as viewed from a certain light-emitting functional lines 2, the transparent conductive lines 4 are always arranged on a front surface in FIG. 1. On the other hand, most of the inter-X-layer insulating lines 8, which constitute the group of X lines, are arranged on a back surface in FIG. 1. In such a braided structure, on the front surface, the transparent conductive lines 4 are always arranged on the light-emitting functional lines 2. Areas in which the transparent conductive lines 4 are arranged on the light-emitting functional lines 2 are defined as light emitting portions 10. Each of the light emitting portions 10 is located in a rectangular area enclosed by the corresponding inter-Y-layer insulating lines 6 and inter-X-layer insulating lines 8. The rectangular area is defined as a unit pixel portion 12. Accordingly, in the structure shown in FIG. 1, the unit pixel portions 12 are arranged in a matrix in the Y and X directions. Inside the unit pixel portions 12, the light emitting portions 10 are similarly arranged in a matrix.

In the structure shown in FIG. 1, the transparent conductive lines 4 correspond to X direction wires for matrix driving. Conductive lines included in the light-emitting functional lines 2 correspond to Y direction wires. Accordingly, matrix driving can be executed on the crossing portions between the transparent conductive lines 4 and the light-emitting functional lines 2. The unit pixel portions 12 are arranged at the crossing portions between the transparent conductive lines 4 and the light-emitting functional lines 2. Further, in each of the crossing portions, the transparent conductive line 4 is always located on the front surface in FIG. 1. An aggregate of the pixels 12 arranged in a matrix can form a display portion.

Figure 2:
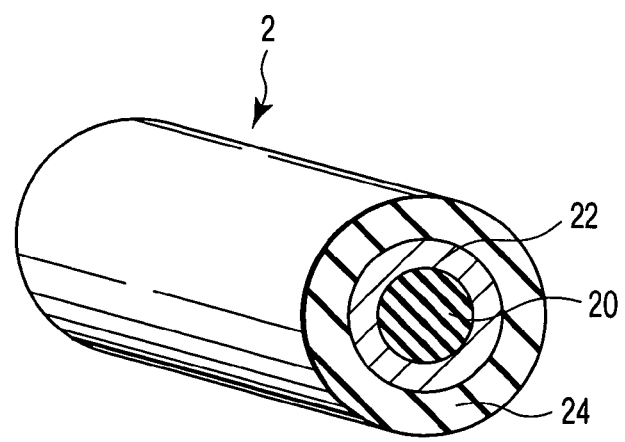
FIG. 2 is a cross-sectional perspective view showing an example of the structure of light-emitting functional lines shown in FIG. 1.

FIG. 2 shows an example of the structure of the light-emitting functional lines 2, shown in FIG. 1. A core line 20 of the light-emitting functional lines 2 may be composed of, for example, a molybdenum (Mo) line of diameter 100 μm which has its surface sufficiently cleaned. On this surface, a conductive layer 22 composed of a silver (Ag) film of thickness about 200 nm is formed using a plating method. Although the Mo line is conductive, the surface of the Mo line, which serves as the core line 20, is coated with Ag, which serves as the conductive layer 22, in view of the degradation of conductivity caused by the oxidation of surface of the Mo line. Then, a light emitting layer 24 is formed on the Ag coat. Further, an alloy of silver (Ag) and calcium (Ca) may be used to reduce the work function of metal electrodes.

In Embodiment 1, for example, an electroluminescent (EL) material composed of an organic substance such as polyphenylene vinylene can be used as the light emitting layer 24. This is because the use of an EL material consisting of a polymer material enables film formation based on wet coating. If a film is formed around the peripheries of linear members such as those of this embodiment, it is possible to immerse the linear members in the EL material and then pull up the linear members while adjusting a pull-up speed.

Figure 3:
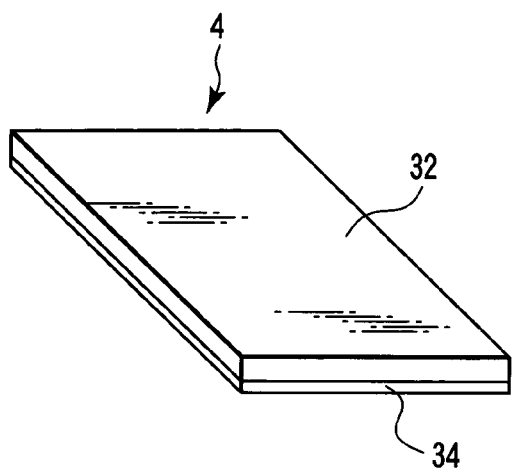
FIG. 3 is a perspective view schematically showing the structure of a transparent conductive line shown in FIG. 1.

FIG. 3 shows an example of the structure of the transparent conductive line 4. It is necessary that the visible light can be transmitted through the transparent conductive line 4. In this embodiment, a composite oxide (ITO) consisting of indium and tin is used to form a conductive layer 34 of thickness about 200 nm on a film 32 of thickness about 50 μm made of polyethylene terephthalate. As shown in FIG. 3, the ITO conductive layer 34 is formed on one surface of the film 32. The ITO conductive layer 34 is placed on a side of the crossing portion between the transparent conductive line 4 and the light-emitting functional lines 2, shown in FIG. 1, with which side the transparent conductive line 4 contacts.

Figure 4:
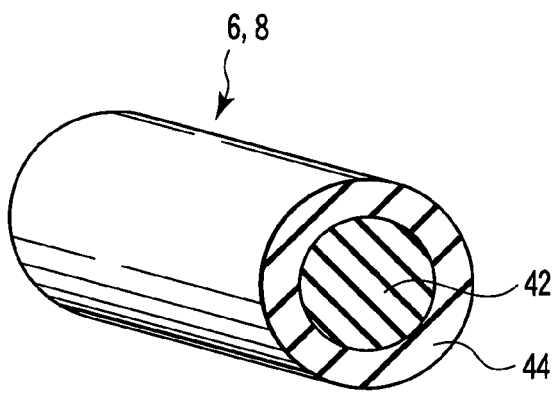
FIG. 4 is a cross-sectional perspective view schematically showing the structure of an inter-layer insulating line shown in FIG. 1.

FIG. 4 shows an example of the structure of the inter-X-layer insulating line 8 and inter-Y-layer insulating lines 6. The function of the inter-layer insulating lines 6 and 8 is to maintain a matrix structure while preventing the short circuit between the light-emitting functional lines 2 and the transparent conductive line 4. In this embodiment, polyallylate fibers are used as an insulating line of the core 42. Further, an elastic layer 44 composed of butadiene rubber is formed around the periphery of the insulating line. This is to prevent the inter-layer insulating lines from being rubbed or twisted between the light-emitting functional lines 2 and the transparent conductive line 4 during surface spread based on weaving. Further, the inter-layer insulating lines 6 and 8 desirably have shades of black. This is because the inter-layer insulating lines 6 and 8 also serve as a black matrix.

Figure 5:
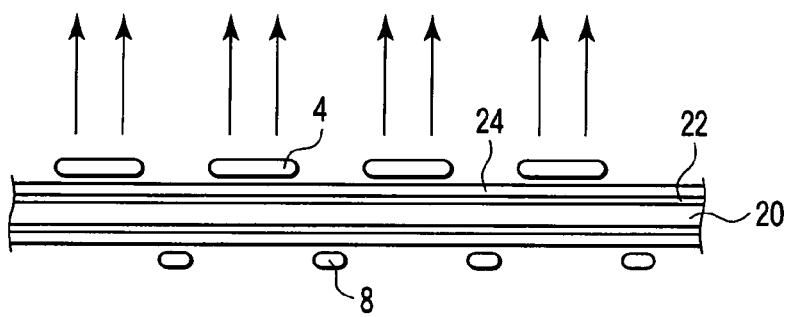
FIG. 5 is a schematic sectional view of the display device schematically showing a sectional structure taken along line V-V in FIG. 1.
Figure 6:
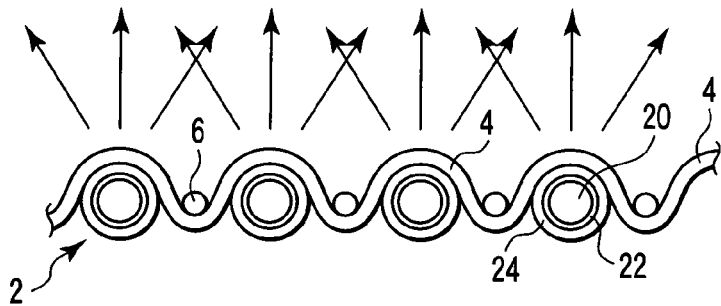
FIG. 6 is a schematic sectional view of the display device schematically showing a sectional structure taken along line VI-VI in FIG. 1.

Now, with reference to FIGS. 5 to 7, a detailed description will be given of the matrix structure shown in FIG. 1. FIG. 5 schematically shows a sectional structure taken along line V-V in FIG. 1. FIG. 6 schematically shows a sectional structure taken along line VI-VI in FIG. 1. In FIGS. 5 and 6, arrows indicate a direction in which the display device emits light. The arrows correspond to the upper part of the sheet of the FIG. 1. As shown in FIGS. 5 and 6, in the crossing portion between the light-emitting functional lines 2 and the transparent conductive line 4, the transparent conductive line 4 is always placed on the upper side of the sheet of FIG. 1. Thus, provided that the upper side of the sheet of FIG. 1 is a display portion, a matrix-drivable display device is realized.

Figure 7:
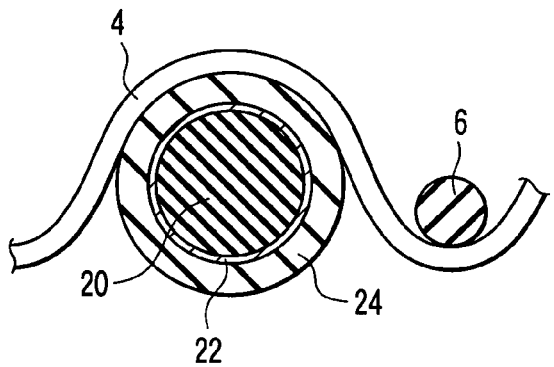
FIG. 7 is a schematic sectional view schematically showing a unit pixel in the display device taken along line VI-VI in FIG. 1.

FIG. 7 schematically shows the sectional structure of the unit pixel 12 taken along line VI-VI in FIG. 1. In this case, the light emitting layer 24 for EL is sandwiched between the conductive layer 22 of the light-emitting functional lines 2 and the transparent conductive line 4. Accordingly, when a driving voltage is applied between the light-emitting functional lines 2 and the transparent conductive line 4, the light emitting layer 24 emits light. Therefore, in this display device, an arbitrary pixel portion 12 can be luminously driven by subjecting the corresponding light-emitting functional lines 2 and transparent conductive line 4 to matrix driving.

Figure 8:
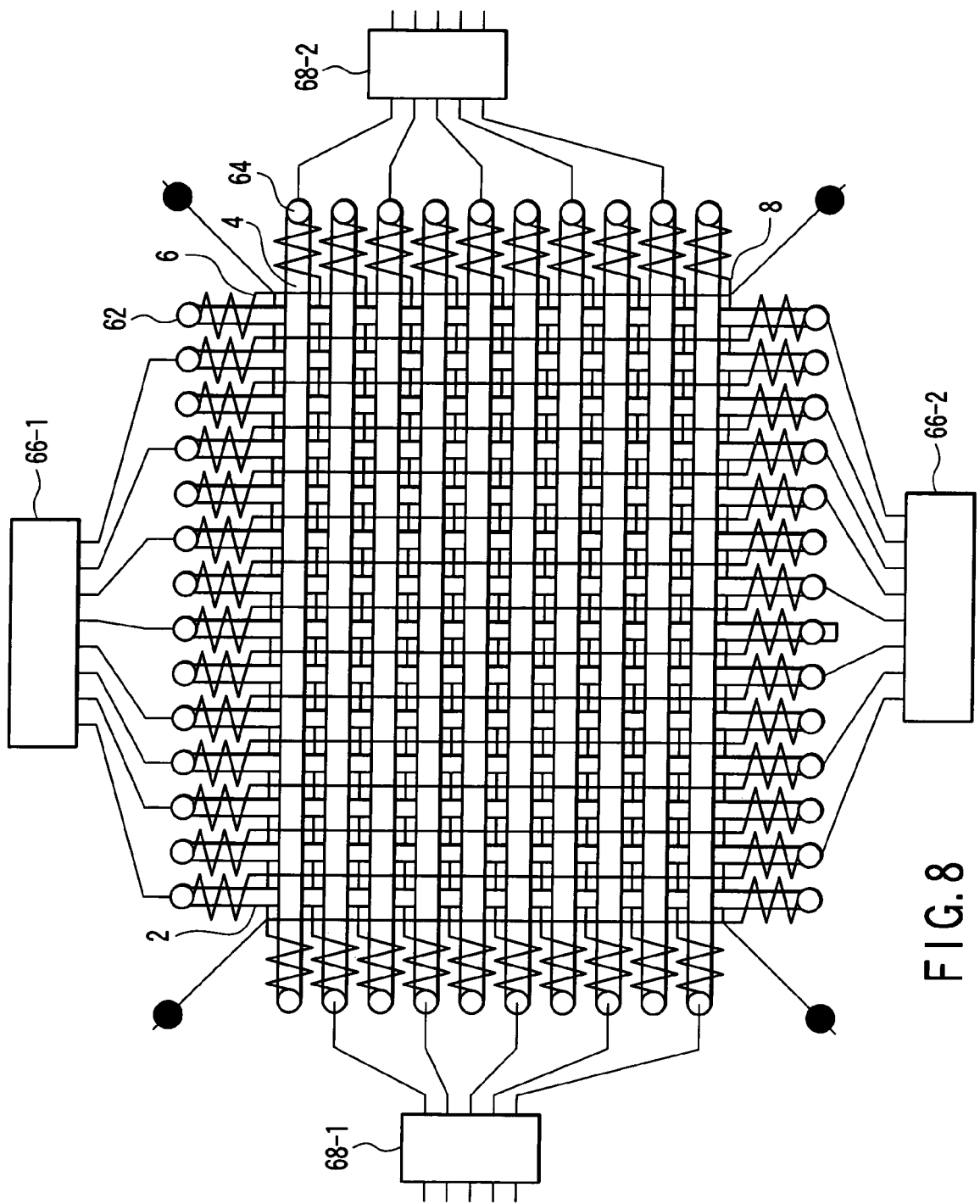
FIG. 8 is a plan view schematically showing the display device shown in FIG. 1 and comprising a matrix structure.

FIG. 8 is a plan view showing the configuration of a display device having the spontaneous light matrix structure shown in FIG. 1. The display device shown in FIG. 8 is a monochromatic one composed of 14×10 pixels. The ends of each light-emitting functional line 2 and each transparent conductive line 4 are fixed to terminals 62 and 64, respectively. The terminal portions 62 and 64 are connected to driving circuit portions 66-1, 66-2, 68-1, 68-2 to allow the display device to operate on the basis of passive matrix driving. That is, the driving circuit portions 66-1 and 66-2, which comprise column driving circuit, are connected to the light-emitting functional lines 2 via the terminals 62. The driving circuit portions 68-1 and 68-2, which comprise row driving circuit, are connected to the transparent conductive lines 4 via the terminals 64. The driving circuit portions 66-1 and 66-2 sequentially apply voltages to the transparent conductive lines 4, which serve as row lines. In response to the application of the voltages, the driving circuit portions 68-1 and 68-2 apply voltages to the light-emitting functional lines 2, which serve as column lines. The application of the voltages causes the pixel portions 12 specified by the rows and columns to emit light to show an arbitrary image on the display device.

Now, with reference to FIGS. 9 and 10, description will be given of a method for manufacturing the display device described with reference to FIGS. 1 to 8.

Figure 9A:
FIGS. 9A and 9B are diagrams illustrating a process of manufacturing a light-emitting functional lines for the display device shown in FIG. 1 and comprising a matrix structure.
Figure 9B:

FIGS. 9A and 9B show a step of manufacturing the light-emitting functional lines 2. During the manufacturing process, a molybdenum (Mo) line of thickness about diameter 200 μm is electrolytically polished to obtain a core line material used to manufacture the light-emitting functional lines 2 as shown in FIG. 9A. Then, an electrolytic plating method is used to form a conductive layer 22 composed of a silver (Ag) film of thickness about 200 nm, on the surface of the Mo line. The plating process can be executed on the surfaces of continuously supplied Mo lines; it can be continuously executed on the line materials each comprising the conductive layer 22. Subsequently, polyphenylene vinylene (PPV) having its viscosity adjusted using a solvent is applied to the surface of the conductive layer 22. For the application method, it is possible to continuously form films by immersing Ag-plated Mo lines into a PPV bath and then pulling them up. On this occasion, the thickness of the light emitting layer 22 can be determined by the viscosity of the PPV bath and the pull-up speed for the Mo lines. By way of example, the thickness of PPV is adjusted to about 60 nm. The Mo line is dried and then solidified to manufacture a light-emitting functional lines 2 such as the one shown in FIG. 9B.

Figure 10A:
FIGS. 10A and 10B are diagrams illustrating a process of manufacturing an inter-layer insulating film for the display device shown in FIG. 1 and comprising a matrix structure.
Figure 10B:
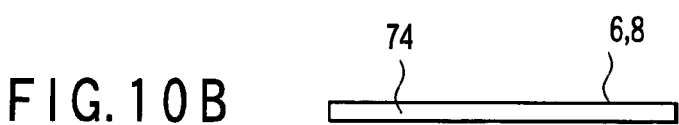

FIGS. 10A and 10B show a step of manufacturing the inter-layer insulating lines 6 and 8. As shown in FIG. 10A, polyallylate fibers having a diameter of about 75 μm which are used as the core line 72 are provided in order to manufacture the inter-layer insulating lines 6 and 8. As shown in FIG. 10B, melted butadiene rubber used as a buffer portion 74 is applied to a peripheral portion of the core line. By way of example, the butadiene rubber layer for the inter-layer insulating lines 6 and 8 is formed to a thickness of about 25 μm. The butadiene rubber layer, which serves as the buffer portion 74, has the function of a buffer material for reducing loads imposed by other members when a braided structure such as the one shown in FIG. 1 is manufactured.

Figure 11A:
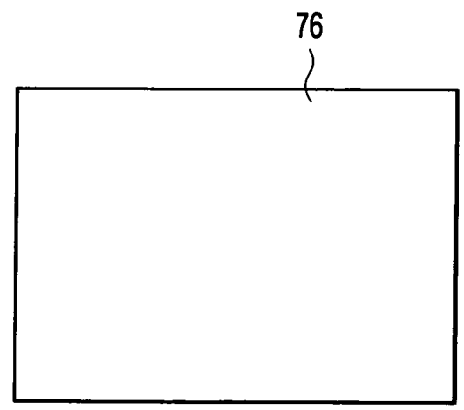
FIGS. 11A and 11B are diagrams illustrating a process of manufacturing transparent conductive lines for the display device shown in FIG. 1 and comprising a matrix structure.
Figure 11B:
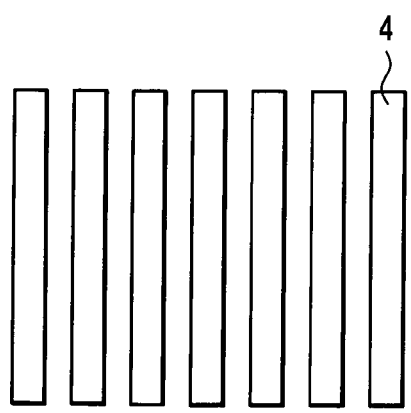

FIGS. 11A and 11B show a step of manufacturing the transparent conductive lines 4. As shown in FIG. 11A, a film is provided which is used to manufacture the transparent conductive lines 4. Subsequently, in view of the convenience of ITO film formation, a sputtering method is used to form ITO into a film of thickness about 200 nm on a surface of the plane-like film. A film structure 76 into which ITO have been formed is cut into bands by a laser cut method to manufacture the transparent conductive lines 4. By way of example, after the cutting, each of the band-like transparent conductive lines 4 is about 200 nm.

For the group of line materials described as an example, the light-emitting functional lines 2 and the transparent conductive lines 4 are specified to diameter 200 μm and the inter-layer insulating lines 6 and 8 are specified to diameter 100 μm. Accordingly, for the purpose of assembling the line materials into a display device, the size of one pixel and inter-pixel pitch are designed to be about 200×about 200 μm and about 100 μm, respectively, if possible deformation resulting from weaving is not taken into account. The dimensions of the line materials are only illustrative. It is possible to arbitrarily and easily change the materials or machining widths of the light-emitting functional lines 2, inter-layer insulating lines, and transparent conductive lines 4. Therefore, fineness can be easily changed.

Figure 12A:
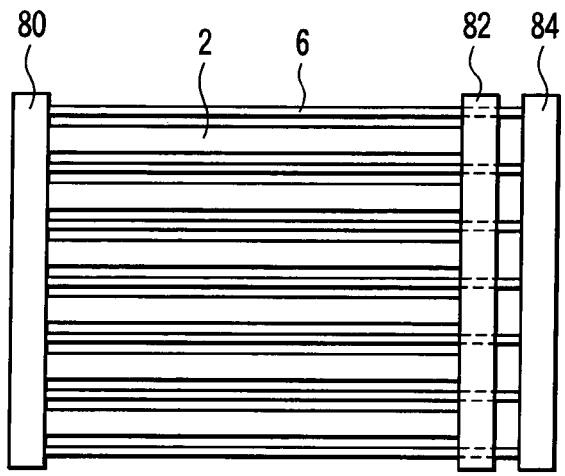
FIGS. 12A and 12B are a plan view showing a manufacturing apparatus that braids light-emitting functional lines and inter-layer insulating lines shown in FIG. 1 and a plan view of a manufacturing apparatus that braids transparent conductive lines and inter-layer insulating lines shown in FIG. 1.
Figure 12B:
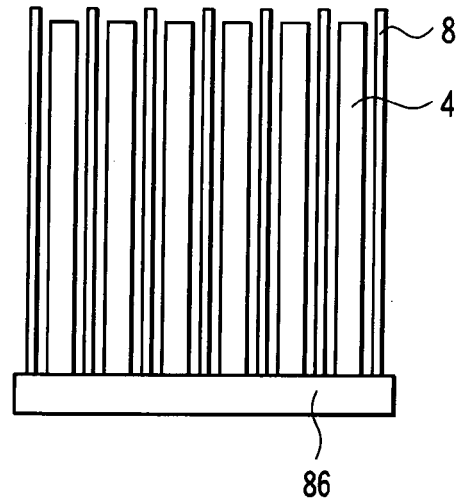

Then, the group of line materials formed as described above are prepared, and as shown in FIGS. 12A and 12B, frames 80, 82, 84, and 86 are fixed to the ends of the line materials. In this case, as shown in FIG. 12A, first ends of the light-emitting functional lines 2 and inter-layer insulating lines 6 are fixed to the frame 80 so as to alternate with one another. Second ends of the light-emitting functional lines 2 are fixed to the frame 82. Second ends of the inter-layer insulating lines 6 are fixed to the frame 84. The inter-layer insulating lines 6 are specified to have a larger line length than the light-emitting functional lines 2. The frame 84 is placed outside the frame 82. Grooves 88 are formed in the frame 82, to which the light-emitting functional lines 2 are fixed, so as to receive the inter-layer insulating lines 6. Consequently, the frame 84 is moved up and down with respect to the sheet of the figures to move the inter-layer insulating lines 6 into and out of the grooves 88. This enables a plane defined by the inter-layer insulating lines 6 to move up and down with respect to a plane defined by the light-emitting functional lines 2 as the frame 84 moves up and down. As shown in FIG. 12B, first ends of the transparent conductive lines 4 and inter-layer insulating lines 8 are fixed to the frame 86 so as to alternate with one another, with second ends serving as free ends. On the frame 86, the arrangement of the first ends of the transparent conductive lines 4 and the arrangement of the first ends of the inter-layer insulating lines 8 are preferably present on different straight lines. Further, the first ends of the transparent conductive lines 4 and inter-layer insulating lines 8 are preferably staggered.

As shown in FIG. 12A, the transparent conductive lines 4 are more flexible than the light-emitting functional lines 2 and have a higher degree of freedom in weaving. Accordingly, the second ends of the transparent conductive lines 4 are not fixed but used as free ends. The frames 80, 82, 84, and 86 preferably comprise the terminals 62 and 64 so as to constitute a display device as they are when driving circuits are attached to the terminals 62 and 64.

Figure 13:
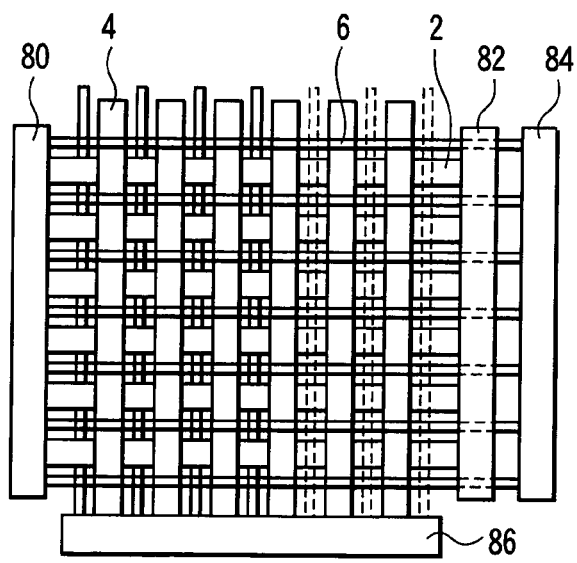
FIG. 13 is a diagram showing a process of using the manufacturing apparatus shown in FIGS. 12A and 12B to braid line materials.

The structures shown in FIGS. 12A and 12B are prepared and arranged so as to cross at right angles. Then, the second ends of the transparent conductive lines 4 and inter-layer insulating lines 6 are inserted between the plane defined by the inter-layer insulating lines 6 and the plane defined by the light-emitting functional lines 2. Thus, both structures are braided as shown in FIG. 13. That is, the frames 80, 82, and 84 are arranged so that the frame 86 is orthogonal to the frames 80, 82, and 84. The second ends of the transparent conductive lines 4 and inter-layer insulating lines 8 are inserted between the plane defined by the inter-layer insulating lines 6 and the plane defined by the light-emitting functional lines 2 so that the second ends of the light-emitting functional lines 2 pass under the outermost peripheral insulating line 8 and over the outermost peripheral light-emitting functional lines 2 and that the second ends of the inter-layer insulating lines 6 pass over the outermost peripheral insulating line 8 and under the outermost peripheral light-emitting functional lines 2. Then, the frame 84 is raised while the second ends of the transparent conductive lines 4 and inter-layer insulating lines 6 advance. The frame 84 is then lowered so that the second ends of the light-emitting functional lines 2 pass under the next insulating line 8 and over the next light-emitting functional lines 2 and that the second ends of the inter-layer insulating lines 6 pass over the next insulating line 8 and under the next light-emitting functional lines 2. This operation is repeated to obtain a structure in which the transparent conductive lines 4 and inter-layer insulating lines 8 are braided into the light-emitting functional lines 2 and inter-layer insulating lines 6 as shown FIG. 13. Subsequently, the frames 80, 82, and 84 are removed to provide a cloth-like braided structure.

The transparent conductive lines 4 and the inter-layer insulating lines 6 need not be fixed to the frame 86 in contrast to FIG. 12B. Then, a braided structure such as the one shown in FIG. 13 may be obtained by alternately inserting the transparent conductive lines 4 and the inter-layer insulating lines 8 between the light-emitting functional lines 2 and the inter-layer insulating lines 6 as the frame 84 moves up and down so that the transparent conductive lines 4 and inter-layer insulating lines 8 are orthogonal to the light-emitting functional lines 2 and inter-layer insulating lines 6. Further, if the frames 80, 82, 84, and 86 comprise terminals, the frames 80, 82, 84, and 86 need not be removed in contrast to FIG. 14. The braided structure fixed to the frames 80, 82, 84, and 86 may be shifted to the next step as it is.

Figure 16:
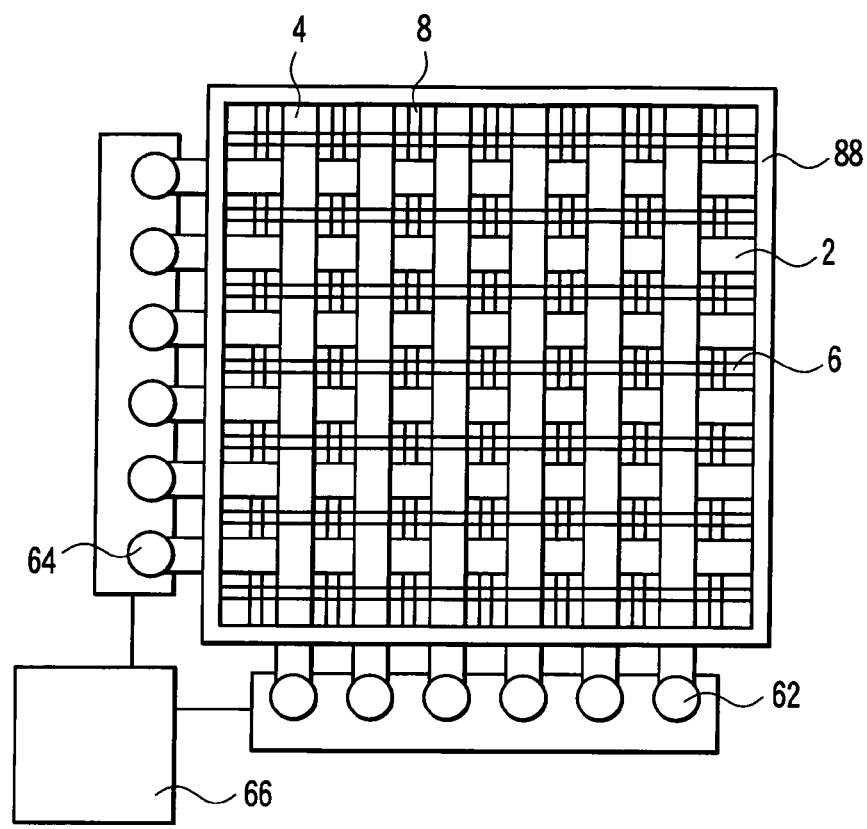
FIG. 16 is a plan view showing a process of forming the display portion shown in FIG. 15 into a display device.
Figure 17:
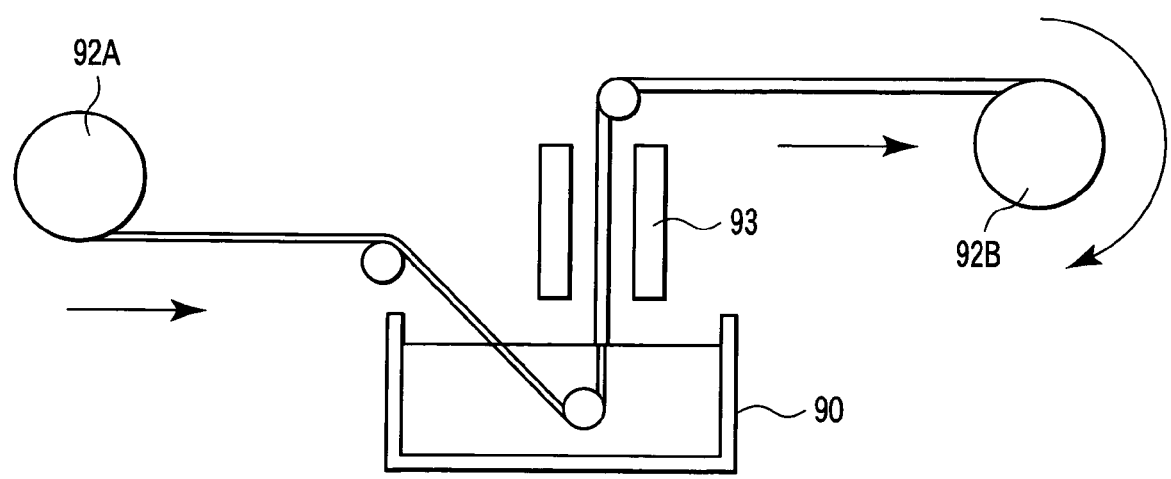
FIG. 17 is a schematic view showing an example of an apparatus that manufactures the light-emitting functional lines shown in FIG. 2.

The braided structure has its peripheral portion fixed using, for example, a photosetting adhesive resin 88 in order to fix the wiring as shown in FIG. 15. On this occasion, the whole structure may be solidified by immersing the whole display portion into the resin rather than immersing only the peripheral portion as shown in FIG. 15. In particular, if the light emitting layer 24 is composed of an organic material that can provide electroluminescent, its light emitting function is extremely likely to be degraded when its material is degraded by the impregnation of moisture from the air and the like. Accordingly, in connection with the improvement of reliability, it is important to cover the whole display portion with a resin or the like which is excellent in protecting the display portion from moisture or the like. Then, as shown in FIG. 16, the ends of the line materials are connected to the fixed terminals 62 and 64. The fixed terminals 62 and 64 are connected to the driving circuit 66 by wire bonding. These steps are executed to complete a passive-matrix-drivable selfluminous display device As described above, since the display device comprising the matrix structure according to the embodiment of the present invention is manufactured by weaving, functional layers can be formed using the line material shapes. Accordingly, the display device comprising the matrix structure according to the embodiment of the present invention can be manufactured using a manufacturing apparatus which can save space and execute continuous processing compared to the conventional process requiring a support substrate. For example, the light-emitting functional lines 2 can be manufactured using an apparatus such as the one shown in FIG. 17. As already described, a molybdenum (Mo) line of about diameter 200 µm is electrolytically polished to obtain a core line material. Then, the electrolytic plating method is used to form a conductive layer 22 composed of a silver (Ag) film of thickness about 200 nm, on the surface of the Mo line. The plating process can be executed on the surfaces of Mo lines continuously supplied by an apparatus similar to that shown in FIG. 17; it can be continuously executed on the line materials each comprising the conductive layer 22. Then, as shown in FIG. 17, the Ag-plated Mo line is wound into a roll 92A. The Ag-plated Mo line is then continuously fed from the roll 92A into a PPV applied liquid bath 90. The Mo line is then pulled up and then dried by a heater portion 93. Thus, PPV on the Ag-plated Mo line is continuously formed into a film. The Mo line formed into a film is wound into a roll 92B for the next step.

SECOND EMBODIMENT

A second embodiment of the present invention can provide a display device comprising a structure that is drivable with a divided screen.

Normally, display devices are more easily driven when having a smaller screen size and a smaller number of pixels. This is because with a larger screen, wiring performance more markedly affects display performance and because the amount of time available for writing information to pixels decreases with increasing number of pixels. To avoid this, a system is employed in which a screen recognized by an observer as a single screen is divided into pieces. Here, if the formation of a matrix based on weaving according to the present invention is used, a wire can be pulled out of an arbitrary position opposite to the display surface. It is thus possible to easily form a display device that can be driven by dividing its screen into multiple pieces, compared to the conventional example.

The display device according to the second embodiment of the present invention comprises a basic structure similar to that shown in FIG. 1. Accordingly, the structure of the display device according to the second embodiment is denoted by the same reference numerals as those in FIGS. 1 to 17, with its detailed description omitted.

Figure 18:
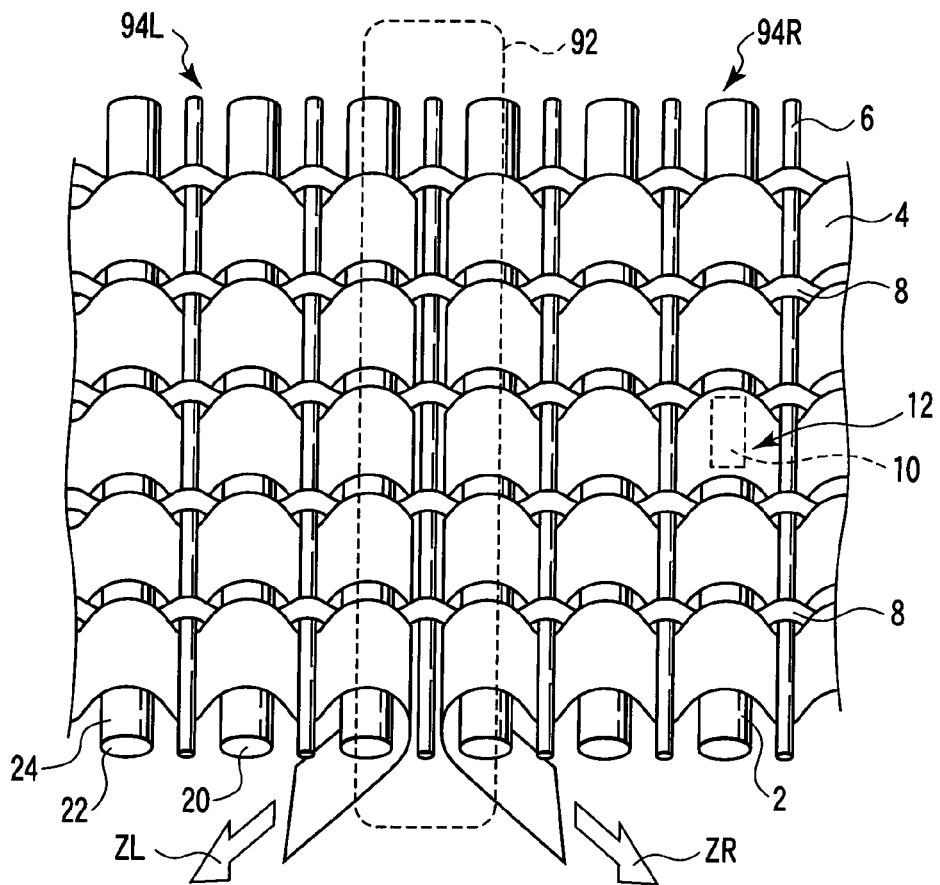
FIG. 18 is a perspective view schematically showing a display device according to a second embodiment of the present invention.

The basic structure of the display device uses spontaneous light as an optical mode and a simple matrix as a driving method. The basic structure of the display device is shown in FIG. 18 and consists of the light-emitting functional lines 2, the transparent conductive lines 4, and the inter-layer insulating lines 6 and 8. The line direction of the light-emitting functional lines 2 is defined as the X direction. The line direction of the transparent conductive lines 4 is defined as the Y direction. In the X direction cross section, the light-emitting functional lines 2 and the inter-layer insulating lines 6 and 8 are alternately arranged (these are called a group of Y lines). In the Y direction cross section, the transparent conductive lines 4 and the inter-layer insulating lines 6 and 8 are alternately arranged (these are called a group of X lines). The group of X lines is arranged parallel to one another and the group of Y lines is arranged parallel to one another. The group of X lines and the group of Y lines are alternately braided in a mesh. That is, the transparent conductive lines 4 are always arranged over the light-emitting functional lines 2.

In this case, the transparent conductive lines 4 have a structure different from that shown in FIG. 1. Each of the transparent conductive lines 4 is not formed of a single line material extending from one end to the other end of the display portion, but in the middle of the display portion, its end is replaced with a separately fixed line material as shown in FIG. 18. That is, as shown in FIG. 18, the group of transparent conductive lines 4 sequentially woven from the left of the display portion is drawn out, in an area 92 shown by a dot line in FIG. 18, in a direction opposite to the display screen as shown by an arrow ZL. Similarly, the group of transparent conductive lines 4 sequentially woven from the right of the display portion is drawn out, in the area 92 shown by a dot line in FIG. 18, in a direction opposite to the display screen as shown by an arrow ZR. In this case, the group of transparent conductive lines 4 having ends fixed to the frame 86 as shown in FIG. 12B can be drawn out by weaving in the area 92 shown by a dot line in FIG. 18. In this case, the display portion is divided into display segments 94L and 94R by the area shown by the dot line in FIG. 18; the display segments 94L and 94R can be driven by the different transparent conductive lines 4. The display segments 94L and 94R can be woven without significantly varying an inter-pixel pitch. A display surface formed of the display segments 94L and 94R can be formed into a structure that appears to be continuous.

Figure 19:
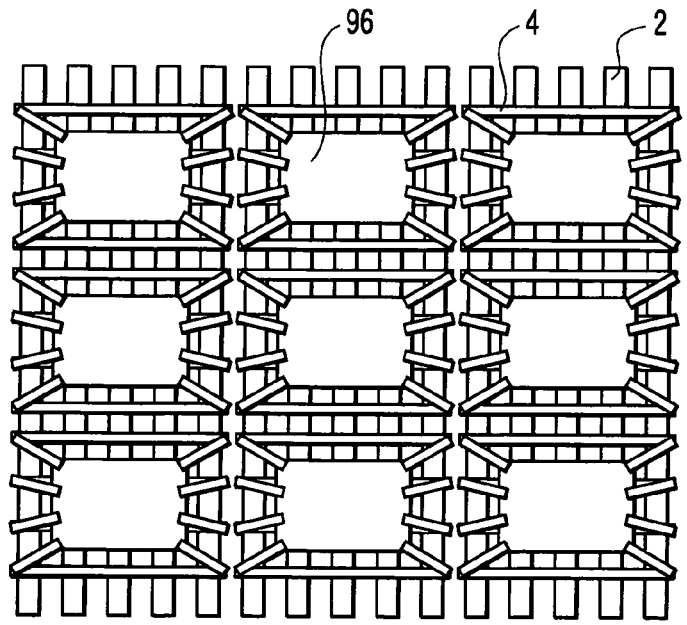
FIG. 19 is a plan view showing a back surface of the display device shown in FIG. 18.

Now, with reference to FIG. 19, description will be given of an example of arrangement of display segments 96 which correspond to nine divided screens and which constitute the display surface. FIG. 19 shows a back surface of the display device which is opposite the display surface. Each of the display segments 96 shown in FIG. 19 corresponds to a part of the display portion enclosed by the areas 92 shown in FIG. 18. Further, the display segments 96 are arranged in three rows and three columns to form a continuous display portion. As shown in FIG. 19, on the back surface of the display device, the transparent conductive lines 4 are extended from each display segment 96 and can be individually connected the driving circuit portions 68-1 and 68-2.

It should be noted that FIG. 19 shows only the group of lines related to the description of a matrix operation and that inter-layer insulating lines 6 and 8 are not illustrated. As shown in FIG. 19, by drawing out the wires from the back surface of the display device, it is possible to mount a part or all of the driving circuit on the back surface. This facilitates the division of the display surface into screen segments. The screen can thus have an arbitrary size. Even if any display segment 96 is surrounded by other display segments 96 and its end surfaces cannot be utilized, a continuous screen can be displayed to the observer. In the structure shown in FIG. 19, the transparent conductive lines 4 are arranged on the back surface of the display device and connected to the driving circuit.

In the structure shown in the present embodiment, only the transparent conductive lines 4 are drawn out from the back surface of the device. However, the present invention is not limited to the transparent conductive lines 4. The transparent conductive lines 4 can be similarly drawn out from the back surface of the device. Further, in the example of arrangement shown in FIG. 19, the number of divisions is nine. However, the present invention is not limited to this. The present invention can deal easily with an increased number of divisions.

THIRD EMBODIMENT

With reference to FIGS. 20 to 24, description will be given of a display device according to a third embodiment of the present invention. In FIGS. 20 to 24, parts shown by the same reference numerals as those in FIGS. 1 to 23 show the same members or portions, with their detailed description omitted.

The display device shown in FIGS. 20 to 24 uses, as an optical mode, a reflective liquid crystal utilizing birefringence, and as a driving method, an active matrix based on a diode system. The display device shown in FIG. 20 comprises an active matrix structure as in the case of the display device shown in FIG. 1. The display device is composed of electro-optical functional lines 100, the transparent conductive lines 4, and the inter-layer insulating lines 6 and 8. In FIG. 20, a direction in which the electro-optical functional lines 100 are extended is defined as the X direction. A direction in which the transparent conductive lines 4 are extended is defined as a Y direction. In an X direction cross section, the electro-optical functional lines 100 and the inter-layer insulating lines 6 are alternately arranged (these are called a group of Y lines). In the Y direction cross section, the transparent conductive lines 4 and the inter-layer insulating lines 8 are alternately arranged (these are called a group of X lines). The group of X lines is arranged parallel to one another and the group of Y lines is arranged parallel to one another. As in the case of the structure shown in FIG. 1, the group of X lines and the group of Y lines are alternately braided in a mesh. Thus, on a front surface in FIG. 20, the transparent conductive lines 4 are always arranged over the electro-optical functional lines 100. That is, as viewed from a certain electro-optical functional line 100, the transparent conductive lines 4 are always arranged on the front surface in FIG. 20. On the other hand, the inter-layer insulating lines 8, which constitute the group of X lines, are arranged on a back surface of the display device in FIG. 20.

In this case, the wiring functions of the transparent conductive lines 4 in FIG. 20 correspond to data lines in active matrix driving. The wiring function of the electro-optical functional lines 100 corresponds to address lines. Therefore, active matrix driving using a thin film diode can be executed on the crossing portions between the transparent conductive lines 4 and the electro-optical functional lines 100.

A diode must be formed in order to realize an active operation. The diode functional layer is formed in the electro-optical functional lines 100 in FIG. 20. FIG. 21 shows an example of a cross section of the electro-optical functional line 100, shown in FIG. 20. The electro-optical functional lines 100 differ from the light-emitting functional lines 2, shown in FIG. 2, in that each of the electro-optical functional lines 100 is provided with an insulating layer 102 that realizes a diode function. The electro-optical functional line 100 has a core line 101 composed of a tantalum (Ta) line of diameter 100 μm which has its surface sufficiently cleaned. The surface of the core line 101 is subjected to tantalum oxidation (TaOx) by a thermal oxidation method to form an insulating layer 102 of thickness about 250 Å. Then, tantalum (Ta) is formed, by the sputtering method, into a conductive layer 104 of thickness about 500 Å on the surface of the insulating layer 102. Moreover, on the tantalum layer formed as the conductive layer 104 by the sputtering method, an Ag layer 104 of thickness about 100 Å is formed taking into account affinity for a layer 106 that produces an electro-optical characteristic. Thus, a layer can be formed in which the Ta core line, the TaOx layer, and the Ta layer are stacked and which provides a diode function. Then, on a surface of the Ag layer, a polymer dispersed liquid crystal (PDLC) layer 106 is formed as an electro-optical characteristic layer by coating and then polymerizing octyloxycyanophenyl (80CB) dissolved into methylmethacrylate (MMA).

The transparent conductive lines 4 and the inter-layer insulating lines 6 and 8 have structures similar to those in the first embodiment.

Now, the matrix structure will be described in detail with reference to FIGS. 22 and 23. FIG. 22 shows a sectional structure taken along line XXII-XXII in FIG. 20.

Figure 23:
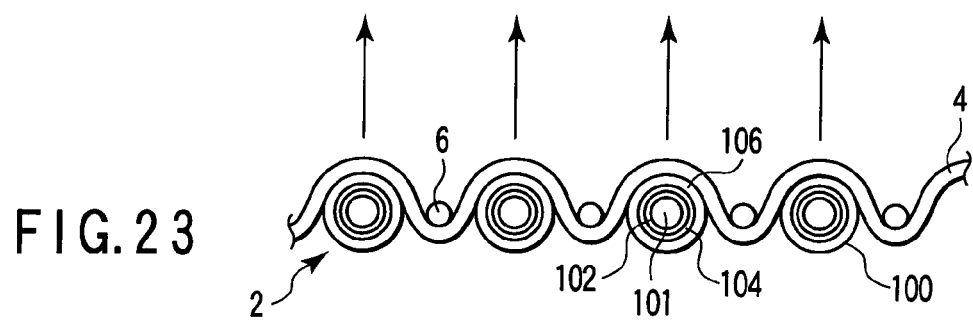
FIG. 23 is a schematic sectional view of the display device schematically showing a sectional structure taken along line XXIII-XXIII in FIG. 20.
Figure 24:
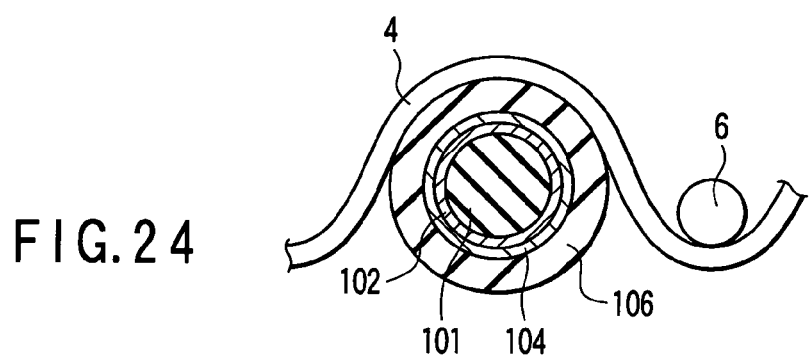
FIG. 24 is a schematic sectional view schematically showing a unit pixel in the display device taken along line VI-VI in FIG. 1.

FIG. 23 shows a sectional structure taken along line XXIII-XXIII in FIG. 20. In FIGS. 22 and 23, arrows show a direction toward the display surface and correspond to the upper side of the sheet of FIG. 20. As shown in FIGS. 23 and 24, in the crossing portions between the electro-optical functional lines 100 and the transparent conductive lines 4, the transparent conductive lines 4 are always placed in the upper side of the sheet of FIG. 20. Accordingly, provided that the upper side of the sheet of FIG. 20 is the display portion, a matrix drivable display device can be realized. Further, FIG. 24 shows a section structure of a portion of FIG. 23 and corresponding to the unit pixel 10 enclosed by the insulating lines 6 and 8. In this case, the PDLC layer is a structure in the electro-optical functional line 100 which is sandwiched between the conductive layer 104 and the conductive layer of the transparent conductive line 4. Accordingly, as viewed from the Ta core line 101, the unit pixel 10 has a sectional structure formed as a diode type active element of Ta/TaOx/Ta/Ag/PDLC/ITO. This active element can be driven to perform an electro-optical operation.

FOURTH EMBODIMENT

Figure 25:
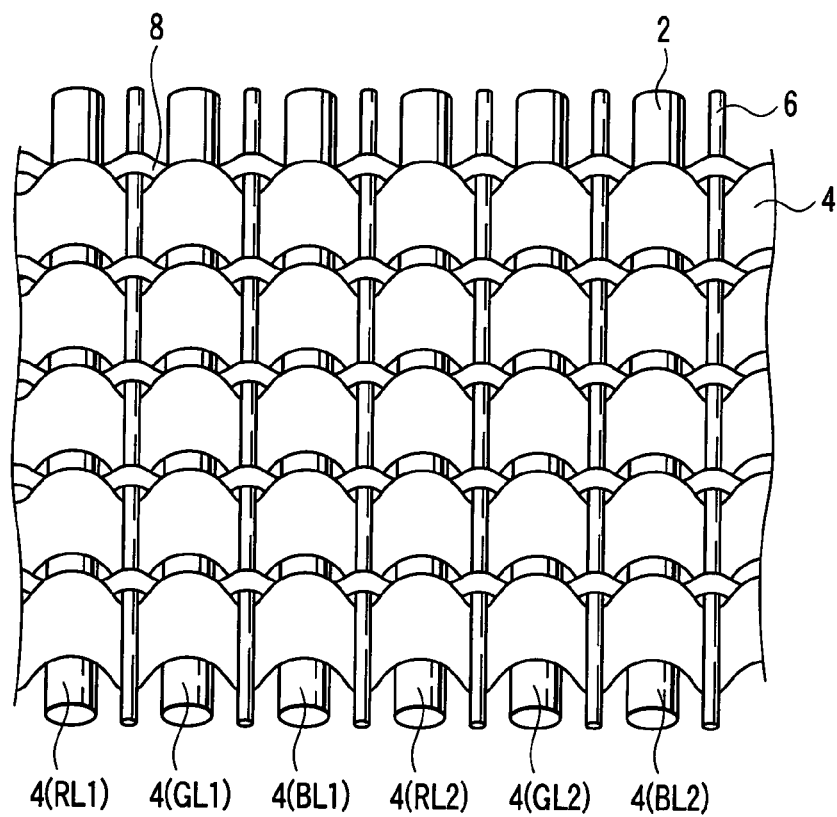
FIG. 25 is a perspective view schematically showing a display device according to a fourth embodiment of the present invention.

FIG. 25 shows a color displayable display device using a selfluminous mode according to a fourth embodiment of the present invention. If a selfluminous display device is used for color display, one pixel is generally divided into three primary colors, red, green, and blue, for display. The display device shown in FIG. 25 realizes color display by using light-emitting organic electroluminescent (OEL) materials for red, green, and blue. The display device comprising the matrix configuration shown in FIG. 25 is composed of light-emitting functional lines 2 (RL) that can emit red light, light-emitting functional lines 2 (GL) that can emit green light, light-emitting functional lines 2 (BL) that can emit blue light, transparent conductive lines 4, and inter-layer insulating lines 6 and 8. In this case, the light-emitting functional lines 2 (RL), the light-emitting functional lines 2 (GL), and the light-emitting functional lines 2 (BL) are arranged substantially parallel to one another. The inter-layer insulating lines 6 are each located between these light-emitting functional lines 2. Further, the transparent conductive lines 4 are arranged almost orthogonally to the group of these lines. The inter-layer insulating lines 8 are each arranged between the transparent conductive lines 4. Here, the group of the light-emitting functional lines 2(RL), 2(GL), and 2(BL) and inter-layer insulating lines 8 and the group of the transparent conductive lines 4 and inter-layer insulating lines 8 are arranged in a mesh so that the transparent conductive lines 4 are located in the upper part of the sheet of FIG. 25.

Now, description will be given of a method for manufacturing the display device shown in FIG. 25.

First, for the light-emitting functional lines 2 (RL, GL, and BL), a material for a core line 20 is a molybdenum (Mo) line of about diameter 60 μm is provided which has been electrolytically polished. The electrolytic plating method is used to form a conductive layer 22 composed of a silver (Ag) film of thickness about 200 nm, on the surface of the Mo line. Such line material machining is common to light-emitting functional lines 2 (RL, GL, and BL). Continuous machining can be executed during the same step. Then, a light emitting layer 24 is composed of an electron transporting host material into which a low-molecular fluorescent dye is doped. In the embodiment, the host material is 1,2,4-triazole derivative (TAZ). Further, different low-molecular fluorescent dyes must be used for the light-emitting functional lines 2(RL), 2(GL), and 2(BL) because these light-emitting functional lines 2 must emit red light, green light, and blue light, respectively. In the present embodiment, the low-molecular fluorescent dye for the light-emitting functional lines 2(RL) is perylene, the low-molecular fluorescent dye for the light-emitting functional lines 2(GL) is coumarin, and the low-molecular fluorescent dye for the light-emitting functional lines 2(BL) is a pyran-based compound (DCJTB). These films are formed using, for example, a vacuum deposition method. The transparent conductive lines 4 and the inter-layer insulating lines 6 and 8 are formed using a method similar to that of the first embodiment.

Figure 26:
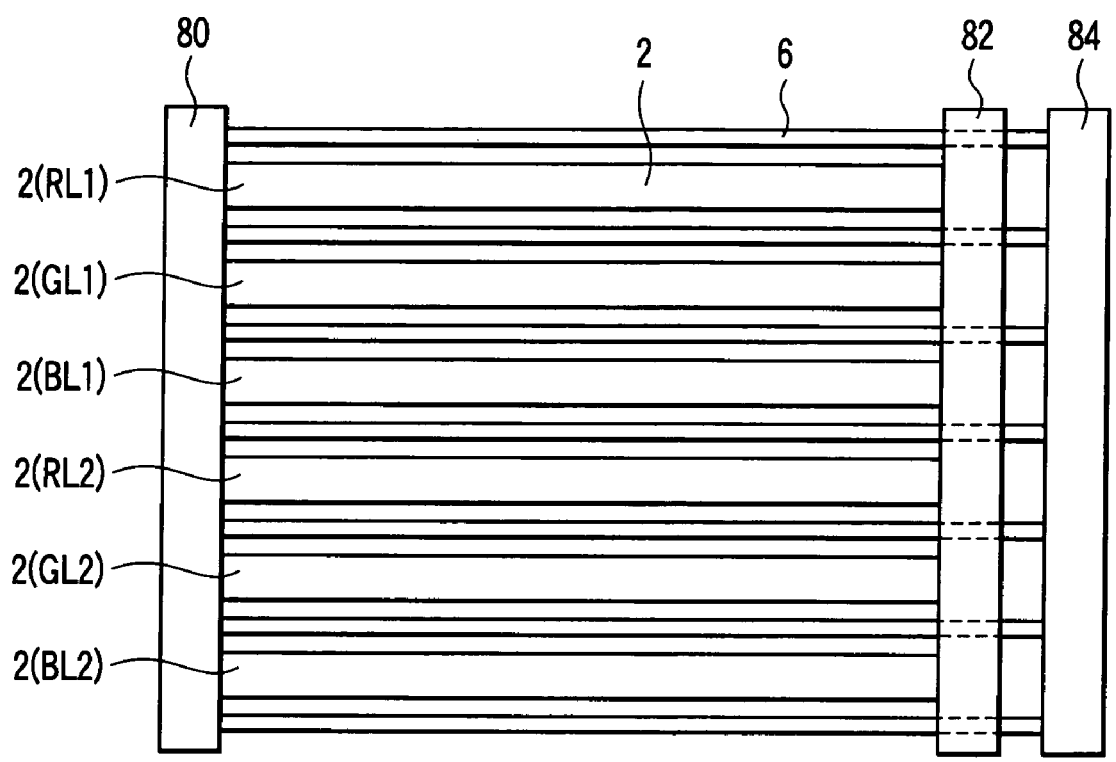
FIG. 26 is a diagram illustrating a process of manufacturing the display device shown in FIG. 25.

As in the case of the first embodiment, the weaving method is used to form a matrix structure of the light-emitting functional lines 2(RL, GL, and BL), transparent conductive lines 4, and inter-layer insulating lines 6 and 8. However, the light-emitting functional lines 2 must be arranged in order of 2(RL), 2(GL), and 2(BL). Accordingly, compared to FIG. 13 for the first embodiment, the light-emitting functional lines 2 are arranged in order of 2(RL), 2(GL), and 2(BL) as shown in FIG. 26.

Further, a display device is obtained using methods for machining a panel and mounting the driving circuits which methods are similar to those of the first embodiment.

In the present embodiment, the light-emitting functional lines 2 are divided into the three groups in order to provide a color display panel. However, a color display panel can be obtained by machining the transparent conductive lines 4. That is, transmissive plastic films colored in red, blue, and green are used to form transparent conductive lines 4. A color display panel can also be obtained by forming an ITO film on the colored film and machining the resulting film into transparent conductive lines 4 as in the case of the first embodiment.

FIFTH EMBODIMENT

In a display device according to a fifth embodiment of the present invention, instead of the transparent conductive lines 4 according to the first embodiment, colored conductive lines 114 are used which are made of a colored wiring material having a low resistance.

Typically, when formed on a plastic film, an ITO film has a thickness of at most 0.1 μm. This is because if the ITO film has a thickness of larger than 0.1 μm, the ITO film may be peeled off owing to its stress or its flexibility may be limited. Accordingly, when an ITO film is formed on a plastic film, the transparent conductive lines 4 may fail to provide a sufficient electric conductivity. In particular, when a large screen has, for example, a diagonal dimension on the order of 100 inches, the transparent conductive lines 4 must have a low wiring resistance. In this case, the transparent conductive lines 4 according to the first embodiment are desirably composed of a wiring material having a sufficient electric conductivity in spite of the lack of transparency.

Figure 27:
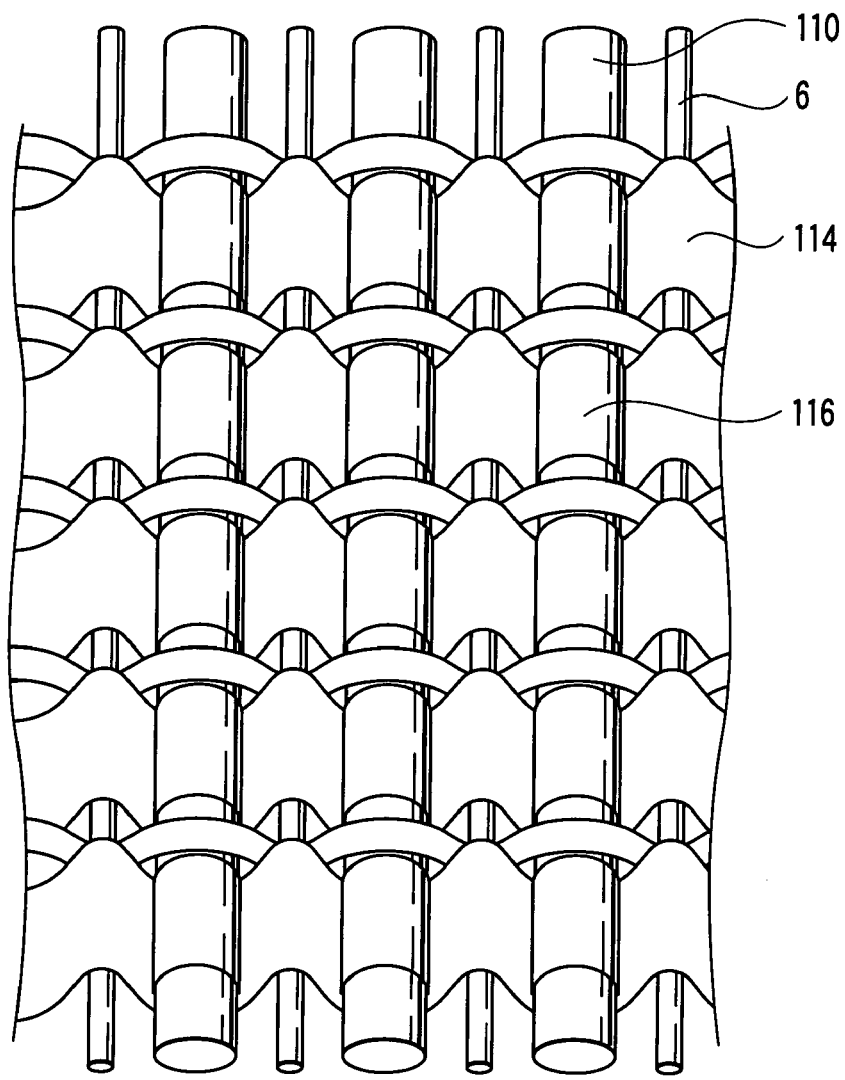
FIG. 27 is a perspective view schematically showing a display device according to a fifth embodiment of the present invention.

A matrix wired display device shown in FIG. 27 uses the colored conductive lines 114 in place of the transparent conductive lines 4. In the display device shown in FIG. 27, the colored conductive lines 114 are woven in a plane opposite to the display surface compared to the first embodiment. Further, conductive segment layers 116 providing a local light emitting region are formed around the periphery of the light-emitting functional lines 2. The conductive segment layers 116 are not continuously formed on the surface of the light-emitting functional lines 2. The conductive segment layers 116 are formed at intervals on the light-emitting functional lines 2 using the same arrangement pitch as that of the colored conductive lines 114. Accordingly, the conductive segment layers 116 contact electrically with the colored conductive lines 114 but are electrically separated from one another on the light-emitting functional lines 2. In the matrix wiring shown in FIG. 27, a conductive segment layer 116 and a colored conductive line 114 electrically connected to the conductive segment layer 116 are electrically insulated by the inter-layer insulating lines 8 from the other conductive segment layers 116 and colored conductive lines 114. However, on the light-emitting functional lines 2, insulating layers (not shown) may each be provided between the conductive segment layers 116 so as to more reliably electrically separate the conductive segment layers 116 from one another.

Figure 28:
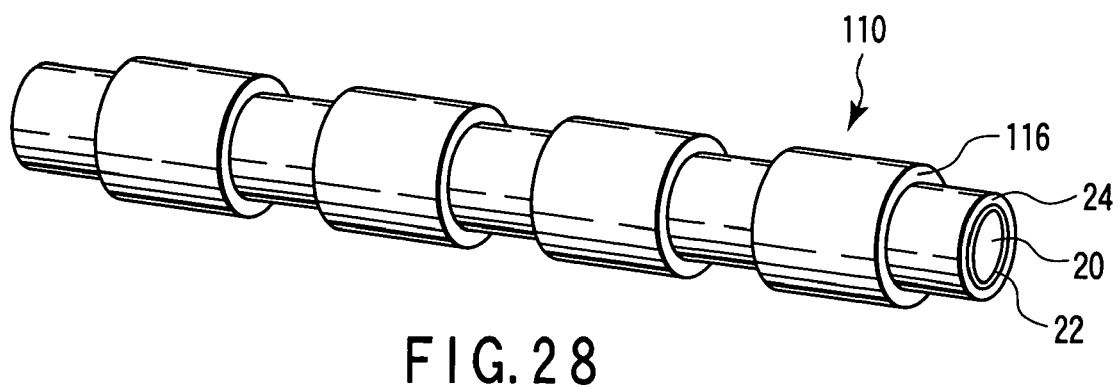
FIG. 28 is a perspective view schematically showing a light-emitting functional line shown in FIG. 27.

FIG. 28 shows an example of the structure of the light-emitting functional lines 2, shown in FIG. 27. The light-emitting functional lines 2 has the core line 20 composed of, for example, a molybdenum (Mo) line of diameter 100 µm which has its surface sufficiently cleaned and a silver (Ag) film of thickness about 200 nm formed as the conductive layer 22 using the plating method. A surface of the Ag coat is coated with a light emitting layer 24 composed of an electroluminescent (EL) material composed of an organic substance such as polyphenylenevinylene (PPV) as in the case of the first embodiment. On the light-emitting functional lines 2, polyethylenedioxythiophene (PDOT-PSS) into which polystyrene sulfonate is doped is used as the conductive segment layers 116, which provide local light-emitting segments. Polyethylenedioxythiophene (PDOT-PSS) is intermittently dropped onto the light-emitting functional lines 2 to coat the light-emitting functional lines 2 with the conductive segment layers 116. In the structure shown in FIGS. 27 and 28, the conductive segment layers 116, which serve as charge transporting layers, are patterned on the light emitting layer 24. However, the light emitting layer 24 may also be formed by patterning.

The colored conductive lines 114 are chromium (Cr) lines of width about 70 µm and thickness 10 µm. Further, the inter-layer insulating lines 6 and 8 are similar to those of the first embodiment.

These line materials are formed into a matrix structure using the weaving method as in the case of the first embodiment. The matrix structure is then assembled into a display device such as the one shown in FIG. 27. In this case, the colored conductive lines 114 are woven so as to lie opposite the display surface in contrast to the first embodiment. Further, in the structure shown in FIG. 27, the position of the colored conductive lines 114 are adjusted so that the colored conductive lines 114 overlap a charge migrating pattern 116 (conductive segment layers) formed on the light-emitting functional lines 2. For the adjustment of the positions, it is important that the colored conductive lines 114 be in contact with the charge migrating pattern formed on light-emitting functional lines 2. That is, a light emitting site within the signal pixel 10 is composed of Mo(Ag)/PPV/PDOT-PSS. Accordingly, light can be emitted from all over the area covered with PDOT-PSS as long as PDOT-PSS and the Cr line are in electric contact with each other even if the contact is partial. Thus, even when the colored conductive lines are located on the back surface opposite to the display surface, light can be emitted to the display surface because the display portion is composed of PDOT-PSS, PPV, and Mo (Ag) as viewed from the display surface.

Further, methods for fixing the panel plane and mounting the driving circuits are similar to those of the first embodiment. Accordingly, their detailed description is omitted.

In the above embodiment, the transparent conductive lines 4 and inter-X-layer insulating lines 8 are braided into the light-emitting functional lines 2 and inter-Y-layer insulating lines 6, and the area enclosed by the inter-X-layer insulating lines 8 and inter-Y-layer insulating lines 6 is specified as the unit pixel portion. This braided structure makes it possible to provide a display device which is suitable for mass production and which is substantially flat, the display device having a pixel portion arranged in a matrix. However, the braided structure need not be provided but the arrangement may be such that the light-emitting functional lines 2 and the transparent conductive lines 4 are crossed with one another to obtain a structure in which the light-emitting functional lines 2 are insulated from one another, while the transparent conductive lines 4 are insulated from one another. By way of example, the light-emitting functional lines 2 may be insulated from one another and arranged parallel to one another, and the transparent conductive lines 4 insulated from one another may be arranged so as to cross the light-emitting functional lines 2. Either of these forms includes a display structure having a combination of the linear light-emitting functional lines 2 and the linear transparent conductive lines 4. The term "linear" refers not only to line materials having circular cross sections but also to flat line materials having elliptic or rectangular cross sections. Further, for the light-emitting functional lines 2, the conductive layer 22 need not be entirely coated with the light emitting layer 24. The conductive layer 22 may be partly coated with the light emitting layer 24 as long as it is insulated from the other components.

As described above, according to the present invention, by using members machined into linear shapes to form a mesh structure constituting a matrix-drivable display device, it is possible to provide a display device which does not require any support substrate during manufacture and which has an arbitrary shape, the display device being drivable with an arbitrary screen division.

With the conventional display device, to form a display device on a support substrate, it is necessary to design and manufacture the device in view of a target matrix structure. However, according to the display device of the present invention, the formation of a display function and the like may be separated from the formation of a matrix structure for manufacture. That is, the wiring function and the electro-optical function or light-emitting function or the like can be created using linear materials which have not been formed into a matrix yet. This eliminates the need for a manufacturing apparatus corresponding to a large area required to manufacture a display device. In other words, film formation and machining can be continuously carried out around the peripheries of the linear materials. This makes it possible to use a compact manufacturing apparatus. Further, since members used are used only around the peripheries of the linear materials, it is possible to reduce the number of members not used in the finished display device and removed.

Furthermore, matrix expansion is carried out by weaving after the linear materials have been provided with the functions. It is thus possible to arbitrarily set, for example, a display area constituted by the linear materials provided with the functions and which are process intermediate members.

Moreover, the display device according to the present invention does not require any support substrate during a manufacturing process. Thus, the area or thickness of the display device can be freely set. Further, for example, a wire can be drawn out from the surface opposite to the display surface at an arbitrary position. In the display device, a seemingly single screen may be divided into a number of segments. The segments may then be caused to perform a divided display operation to reduce driving loads. With the conventional display device, the wire draw-out method is limited and the number of segments into which one screen is divided is limited. However, according to the present invention, it is possible to relatively easily divide the screen into a large number of segments, that is, at least nine segments. That is, the display device according to the present invention can deal relatively easily with the division of the screen into a large number of segments such as nine or sixteen segments.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A display device having a front side and a rear side, comprising:

linear structures each comprising a first linear conductor linearly extended in a first direction and one of a light emitting layer and light emitting parts, which is formed on the first linear conductor, the linear structures being substantially arranged in parallel, first insulating lines each being linearly extended along the first direction and being arranged between the adjacent linear structures, which electrically insulate the linear structures from one another, transparent second linear conductors which are substantially arranged in parallel along the first direction, each of the second linear conductors being extended in a wavy form in a second direction orthogonal to the first direction so as to cross the linear structures and the first insulating lines, the transparent second linear conductors being electrically contacted on the one of the light emitting layer and the light emitting parts at the front side to form light emitting portions which are arranged in a matrix, and the transparent second linear conductors being contacted on the first insulating lines at the rear side so that the light emitting portions are configured to emit light rays from the front side through the transparent second linear conductors, and second insulating lines each being extended in a wavy form along the second direction and being arranged between the adjacent transparent second linear conductors, which electrically insulate the linear conductors from one another, the second insulating lines being contacted on the linear structures at the rear side and being contacted on the first insulating lines at the front side, and the linear structures, the first insulating lines, the transparent second linear conductors and the second insulating lines being braided in a mesh.

2. The display device according to claim 1, wherein the one of the light emitting layer and the light emitting parts has an electro-optical characteristic or a selfiuminous characteristic.

3. The display device according to claim 1, further comprising a driving portion which provides signal voltages to the first and second linear conductors to subject the display device to matrix driving.

4. The display device according to claim 1, wherein the display device is divided into a plurality of segments, and the second linear conductors are extended from an area between the display segments to the outside of the display devices.

5. The display device according to claim 1, wherein the transparent second linear conductors have a flat film shape and are in surface contact with the one of the light emitting layer and the light emitting parts at the front side, respectively.

6. A method for manufacturing a display device having a front side and a rear side, the method comprising:

providing a plurality of linear structures each comprising a first linear conductor linearly extended in a first direction and one of a light emitting layer and light emitting parts, which is formed on the first linear conductor, the linear structures being substantially arranged in parallel, providing first insulating lines each being linearly extended along the first direction and being arranged between the adjacent linear structures, which electrically insulate the linear structures from one another, providing transparent second linear conductors and second insulating lines which insulate the second linear conductors from one another, and forming a light emitting matrix structure by braiding the second linear conductors, the second insulating lines into the linear structures, and the first insulating lines into a mesh, wherein the transparent second linear conductors are substantially arranged in parallel along the first direction in a manner that each of the second linear conductors is extended in a wavy form in a second direction orthogonal to the first direction to cross the linear structures and the first insulating lines, the transparent second linear conductors are electrically contacted on the one of the light emitting layer and the light emitting parts at the front side to form light emitting portions which are arranged in a matrix, and the transparent second linear conductors are contacted on the first insulating lines at the rear side so that the light emitting portions are configured to emit light rays from the front side through the transparent second linear conductors, and wherein each of the second insulating lines is extended in a wavy form along the second direction and is arranged between the adjacent transparent second linear conductors, the second insulating lines are contacted on the linear structures at the rear side and are contacted on the first insulating lines at the front side.

7. The method according to claim 6, wherein the one of the light emitting layer and the light emitting parts has an electro-optical characteristic or a selfiuminous characteristic.

8. The method according to claim 6, further providing signal voltages to the first and second linear conductors to drive the display device to matrix driving.

9. The method according to claim 6, wherein the display device is divided into a plurality of segments, and the second linear conductors are extended from an area between the display segments to the outside of the display devices.

10. The method according to claim 6, wherein the transparent second linear conductors have a flat film shape and are in surface contact with the one of the light emitting layer and the light emitting parts at the front side, respectively.

11. A display device having a front side and a rear side and including first and second display segments arranged side by side to provide a display screen, the display device comprising:

linear structures each comprising a first linear conductor linearly extended in a first direction and one of a light emitting layer and light emitting parts, which is formed on the first linear conductor, the linear structures being substantially arranged in parallel and being extended in the first and second display segments, wherein the linear structures include a predetermined pair of linear structures adjacent to a border of the first and second display segments, first insulating lines each being linearly extended along the first direction and being arranged between the adjacent linear structures in the first and second display segments, the first insulating lines electrically insulating the linear structures from one another, and the first insulating lines including a predetermined one of the first insulating lines located between a predetermined pair of linear structures, a first group of transparent second linear conductors which are substantially arranged in parallel along the first direction, each of the second linear conductors being extended in the first display segment in a wavy form in a second direction orthogonal to the first direction so as to cross the linear structures and the first insulating lines, wherein the transparent second linear conductors are electrically contacted on the one of the light emitting layer and the light emitting parts at the front side to form first light emitting portions which are arranged in a matrix in the first display segment, the transparent second linear conductors are contacted on the first insulating lines at the rear side, the transparent second linear conductors are drawn out between the predetermined one of the first insulating lines and the one of the predetermined pair of linear structures from the front side to the rear side, and the first light emitting portions are configured to emit light rays from the front side through the transparent second linear conductors, a second group of transparent third linear conductors which are substantially arranged in parallel along the first direction, each of the third linear conductors being extended in the second display segment in a wavy form in the second direction so as to cross the linear structures and the first insulating lines, wherein the transparent third linear conductors are electrically contacted on the one of the light emitting layer and the light emitting parts at the front side to form second light emitting portions which are arranged in a matrix in the second display segment, the transparent third linear conductors are contacted on the first insulating lines at the rear side, and the transparent third linear conductors are drawn out between the other predetermined one of the first insulating lines and the one of the predetermined pair of linear structures from the front side to the rear side, and the second light emitting portions being configured to emit light rays from the front side through the transparent second linear conductors, and second insulating lines each being extended in a wavy form along the second direction and being arranged between the adjacent transparent second and third linear conductors, which electrically insulate the linear conductors from one another, the second insulating lines being contacted on the linear structures at the rear side and being contacted on the first insulating lines at the front side, and the linear structures, the first insulating lines, the transparent second and third linear conductors and the second insulating lines being braided in a mesh.

12. The display device according to claim 11, wherein the second and third linear conductors have a flat film shape and are in surface contact with the one of the light emitting layer and the light emitting parts at the front side, respectively.

13. The display device according to claim 11, further including third and fourth display segments arranged side by side, the first, second, third and fourth display segments forming a matrix to provide the display screen, wherein the linear structures are extended in the third and fourth display segments, the predetermined pair of linear structures is adjacent to a border of the third and second display segments, and the first insulating lines are arranged between the adjacent linear structures in the third and fourth display segments, said display device further comprising:

a third group of transparent fourth linear conductors which are substantially arranged in parallel along the first direction, each of the fourth linear conductors being extended in the third display segment in a wavy form in the second direction, wherein the transparent fourth linear conductors are electrically contacted on the one of the light emitting layer and the light emitting parts at the front side to form third light emitting portions which are arranged in a matrix in the third display segment, the transparent fourth linear conductors are contacted on the first insulating lines at the rear side, the transparent fourth linear conductors are drawn out between the predetermined one of the first insulating lines and the one of the predetermined pair of linear structures from the front side to the rear side, the third light emitting portions are configured to emit light rays from the front side through the transparent second linear conductors, a fourth group of transparent fifth linear conductors which are substantially arranged in parallel along the first direction, each of the fifth linear conductors being extended in the fourth display segment in a wavy form in the second direction so as to cross the linear structures and the first insulating lines, wherein the transparent fourth linear conductors are electrically contacted on the one of the light emitting layer and the light emitting parts at the front side to form fourth light emitting portions which are arranged in a matrix in the fourth display segment, the transparent fifth linear conductors are contacted on the first insulating lines at the rear side, and the transparent fifth linear conductors are drawn out between the other predetermined one of the first insulating lines and the one of the predetermined pair of linear structures from the front side to the rear side, and the fourth light emitting portions are configured to emit light rays from the front side through the transparent second linear conductors, and third insulating lines each being extended in a wavy form along the second direction and being arranged between the adjacent transparent fourth and fifth linear conductors, which electrically insulate the linear conductors from one another, the third insulating lines being contacted on the linear structures at the rear side and being contacted on the first insulating lines at the front side, and the linear structures, the first insulating lines, the transparent fourth and fifth linear conductors and the second insulating lines being braided in a mesh.

14. A method for manufacturing a display device having a front side and a rear side, and including first and second display segments arranged side by side to provide a display screen, the method comprising:

providing a plurality of linear structures each comprising a first linear conductor linearly extended in a first direction and one of a light emitting layer and light emitting parts, which is formed on the first linear conductor, the linear structures being substantially arranged in parallel, wherein the linear structures include a predetermined pair of linear structures adjacent to a border of the first and second display segments, providing first insulating lines each being linearly extended along the first direction and being arranged between the adjacent linear structures, the first insulating lines electrically insulating the linear structures from one another, and including a predetermined one of the first insulating lines being located between a predetermined pair of linear structures, providing a first group of transparent second linear conductors, a second group of transparent third linear conductors, and second insulating lines which insulate the second and third linear conductors from one another, and forming a first light emitting matrix structure in the first display segment by braiding the second linear conductors, the second insulating lines into the linear structures and the first insulating lines into a mesh, wherein the transparent second linear conductors are substantially arranged in parallel along the first direction in a manner that each of the second linear conductors is extended in a wavy form in a second direction orthogonal to the first direction to cross the linear structures and the first insulating lines, the transparent second linear conductors are electrically contacted on the one of the light emitting layer and the light emitting parts at the front side to form first light emitting portions which are arranged in a matrix to provide the first display segment, the second linear conductors are contacted on the first insulating lines at the rear side, and the second linear conductors are drawn out between the predetermined one of the first insulating lines and the one of the predetermined pair of linear structures from the front side to the rear side, and the first light emitting portions being configured to emit light rays from the front side through the transparent second linear conductors, forming a second light emitting matrix structure in the second display segment by braiding the third linear conductors, the second insulating lines into the linear structures and the first insulating lines into a mesh, wherein the transparent third linear conductors are substantially arranged in parallel along the first direction in a manner that each of the third linear conductors is extended in a wavy form in the second direction to cross the linear structures and the first insulating lines, the transparent third linear conductors are electrically contacted on the one of the light emitting layer and the light emitting parts at the front side to form second light emitting portions which are arranged in a matrix to provide the second display segment, the transparent third linear conductors are contacted on the first insulating lines at the rear side, and the transparent third linear are drawn out between the predetermined one of the first insulating lines and the other one of the predetermined pair of linear structures from the front side to the rear side, and the second light emitting portions being configured to emit light rays from the front side through the transparent second linear conductors, and wherein each of the second insulating lines is extended in a wavy form along the second direction and is arranged between the adjacent transparent second and third linear conductors, and the second insulating lines are contacted on the linear structures at the rear side and are contacted on the first insulating lines at the front side.

15. The method according to claim 14, wherein the second and third linear conductors have a flat film shape and are in surface contact with the one of the light emitting layer and the light emitting parts at the front side, respectively.

16. The method according to claim 14, further including third and fourth display segments arranged side by side, the first, second, third and fourth display segments forming a matrix to provide the display screen, wherein the linear structures are extended in the third and fourth display segments, the predetermined pair of linear structures is adjacent to a border of the third and second display segments, and the first insulating lines are arranged between the adjacent linear structures in the third and fourth display segments, said display device further comprising:

a third group of transparent fourth linear conductors which are substantially arranged in parallel along the first direction, each of the fourth linear conductors being extended in the third display segment in a wavy form in the second direction, wherein the transparent fourth linear conductors are electrically contacted on the one of the light emitting layer and the light emitting parts at the front side to form third light emitting portions which are arranged in a matrix in the third display segment, the transparent fourth linear conductors are contacted on the first insulating lines at the rear side, the transparent fourth linear conductors are drawn out between the predetermined one of the first insulating lines and the one of the predetermined pair of linear structures from the front side to the rear side, and the third light emitting portions are configured to emit light rays from the front side through the transparent second linear conductors, a fourth group of transparent fifth linear conductors which are substantially arranged in parallel along the first direction, each of the fifth linear conductors being extended in the fourth display segment in a wavy form in the second direction so as to cross the linear structures and the first insulating lines, wherein the transparent fourth linear conductors are electrically contacted on the one of the light emitting layer and the light emitting parts at the front side to form fourth light emitting portions which are arranged in a matrix in the fourth display segment, the transparent fifth linear conductors are contacted on the first insulating lines at the rear side, the transparent fifth linear conductors are drawn out between the other predetermined one of the first insulating lines and the one of the predetermined pair of linear structures from the front side to the rear side, and the fourth light emitting portions are configured to emit light rays from the front side through the transparent second linear conductors, and third insulating lines each being extended in a wavy form along the second direction and being arranged between the adjacent transparent fourth and fifth linear conductors, which electrically insulate the linear conductors from one another, the third insulating lines being contacted on the linear structures at the rear side and being contacted on the first insulating lines at the front side, and the linear structures, the first insulating lines, the transparent fourth and fifth linear conductors and the second insulating lines being braided in a mesh.

\* \* \* \* \*